United States Patent [19]

Bennett

[11] 4,363,774

[45] Dec. 14, 1982

[54] PRODUCTION AND UTILIZATION OF ION CLUSTER ACCELERATION

[76] Inventor: Willard H. Bennett, P.O. Box 5342, Raleigh, N.C. 27607

[21] Appl. No.: 149,613

[22] Filed: May 14, 1980

Related U.S. Application Data

[63] Continuation-in-part of Ser. No. 871,868, Jan. 24, 1978.

[51] Int. Cl.$^3$ .......................... G21B 1/00; H01J 29/46
[52] U.S. Cl. .................................. 376/105; 313/362.1
[58] Field of Search ..................... 176/1; 313/359–362; 376/105

[56] References Cited

U.S. PATENT DOCUMENTS

| | | | |
|---|---|---|---|
| 3,212,974 | 10/1965 | LeBoutet et al. | 313/361 |
| 3,230,419 | 1/1966 | Bennett | 176/1 |
| 3,424,974 | 1/1969 | Donnally | 313/362 |
| 3,526,575 | 9/1970 | Bennett | 176/1 |
| 3,610,989 | 10/1971 | Bennett | 176/1 |
| 3,639,849 | 2/1972 | Bennett | 176/1 |
| 3,665,182 | 5/1972 | Goff et al. | 313/362 |
| 3,973,158 | 8/1976 | Otten | 313/362 |
| 4,121,128 | 10/1978 | Roberts | 313/362 |

OTHER PUBLICATIONS

J. Chem. & Phys., vol. 59, No. 9 (Nov. 1974) pp. 4726–4734, Gspann et al.
Proc. of 9th Symp. Fusion Technology (1976) pp. 885–890, Hagewa et al.
High Energy Interactions of Nuclei, Ann. Rev. Nuc. & Part. Sci., vol. 28, pp. 161–205 (1978) Goldhaber et al.
The Study of Elem. Part. by Photo. Meth. (1959) Pergamow Press, Powell et al. plate 13–9.

Primary Examiner—Sal Cangialosi
Attorney, Agent, or Firm—William D. Hall

[57] ABSTRACT

An intense high current, high voltage pulsed beam comprising bursts of electrons of less than 200 nanoseconds duration each, having a beam radius of about 0.5 mm. is projected through an anode consisting of a hollow tube with much smaller diameter than that of the diode tube surrounding the cathode and with diameter diminishing with deeper penetration into the tubular anode. By appropriate selections of combinations of materials, sizes, shapes, and surface treatments surrounding the beam in its travel through the anode, or by means such as ion beams directed back along the beam, or by laser pulses on selected spots inside the anode or on the cathode tip, or by controlled supply of appropriate gases or vapors through a small diameter tubular cathode, either metallic or dielectric, and separately into the tubular anode near the end farthest from the cathode and nearer the target, the beam is made to pinch down to a radius of 0.1 mm. or less, whereupon the beam can strike a solid state target producing nuclear fusion and many useful applications including energy production by fusion, space craft propulsion, and production of new heavy transuranic elements. By introducing selected and controlled local bunching of ions in the finely pinched beam, tiny clusters of the order of $10^8$ to 10 ions of various elements including ions of the heaviest elements can be accelerated to energies of up to more than $10^{12}$ electron-volts per ion which upon impact upon a suitable solid state target produces clusters of showers of particles at such high densities in space and time that they overlap and produce useful energy and many important new kinds of applications.

26 Claims, 13 Drawing Figures

PRODUCTION AND UTILIZATION OF ION CLUSTER ACCELERATION

RELATED APPLICATIONS

This application is a continuation-in-part of my prior copending application Ser. No. 871,868, filed Jan. 24, 1978, entitled "Method of, and Apparatus for, Producing Small Diameter High Power Electron Beams".

BACKGROUND OF THE INVENTION

The development of the theory for the many aspects of the magnetic self-focusing of electron beams (see Bennett, "Magnetically Self-Focusing Streams" Phys. Rev. Vol. 45, 1934, pp. 890-897) began in about 1932 and has been continued through the years [see Bennett (with Roberts) "The Pinch Effect in Pulsed Streams at Relativistic Energies," Plasma Physics, Vol. 10, 1968, pp. 381-389, for more references].

The invention of the controlled thermonuclear fusion of deuterium in about 1951 required the containment and heating by compression of ionized deuterium gas and the principal methods used in the succeeding years have depended for the most part upon the various forms of the pinch effect. After the investment by the United States and other nations of a great amount of effort and hundreds of millions of dollars in this work, it became evident to me that ionized gas probably could not be confined long enough to produce a useful amount of thermonuclear energy before the confinement broke up due to an exasperating variety of instabilities that afflicted the containment mechanisms.

At about this time (circa 1964), a new kind of electron beam producing machine was invented by J. C. Martin in England, and developed in the United States, which could produce currents of more than 20,000 amperes at more than 5,000,000 volts in pulses of duration of less than 200 nanoseconds. (See as References Graybell et. al., Machine developed by Ion Physics Corp., Burlington, Mass., J. App. Phy. Letters, Vol. 8, 1966, p. 18, and Pay, Machine developed by Physics International Company, San Leandro, Calif., Technology Week, 1967, p. 10.) I immediately suggested that if an electron beam of 100,000 amperes at 10,000,000 volts could be concentrated to the order of 0.1 millimeter radius and directed into a solid state deuterium-rich material, a very practical and useful method for the production of energy by the thermonuclear fusion of deuterium would result much before any kind of instability could form and interfere. To test this possibility, I initiated experimental work in 1964 and have continued that work ever since. Several U.S. patents have been issued to me for this work; see:

U.S. Pat. No. 3,510,713—May 5, 1970
U.S. Pat. No. 3,516,906—June 23, 1970
U.S. Pat. No. 3,526,575—Sept. 1, 1970
U.S. Pat. No. 3,610,989—Oct. 5, 1971
U.S. Pat. No. 3,639,849—Feb. 1, 1972
U.S. Pat. No. 3,864,640—Feb. 4, 1975

In the course of this work, I have concentrated electron beams to less than one millimeter diameter and projected them through thin metal foils into room air at atmospheric pressure where each such beam is quite visible and is observed to hold its diameter of less than one millimeter while traveling more than fifty millimeters to a three millimeter thick aluminum target in which it blasts a hole more than six millimeters in diameter.

In experimental work of this kind, the usual practice has been to use a cylindrically symmetrical diode in which the beam is to be formed, which consists of a conducting tube envelope with a cathode support, a cathode, and the beam all along the axis of symmetry. The distance from the cathode support and cathode to the surrounding envelope which is at anode potential must be great enough to avoid excessive destructive transverse field emission and the self-magnetic field of the current must confine the discharge to the beam at and near the axis.

In this work, by the time the beam has concentrated to a little less than a millimeter in diameter, the total energy stored in the self-magnetic field surrounding the beam is approaching the total energy stored in the machine which is driving the discharge and producing the beam so that the beam cannot spontaneously concentrate itself further in this kind of experimental arrangement. Changes in this system, as set forth below, had to be introduced to further reduce the radius of the beam to the order of one-tenth millimeter (100 microns) as required to produce the many very important applications.

SUMMARY OF THE INVENTION

A beam comprising pulses of a duration of less than 200 nanoseconds is pinched to a diameter of about 1 mm. by one of a number of methods one of which might be the method taught in my aforesaid prior U.S. Pat. No. 3,864,690. This beam is then passed into a hole through the anode, in the presence of ions as discussed below, to further pinch it to a radius of about 0.1 mm. Each such pinched pulse has a potential in excess of 500,000 volts and may have, for example, a current of 100,000 amperes, a potential of 10,000,000 volts, and a duration of 40 nanoseconds.

The 0.1 mm. radius beam may be produced as follows. A high voltage pulse generator is employed with a discharge element constituting a cathode. It is designed to discharge the pulse toward an anode. There is a return path, for the current, from the anode to the generator and the cathode in the form of a cylindrical metal element coaxial with the beam and outside of the beam. For a short portion of the distance from the cathode to the front of the anode the inside diameter of the return cylindrical element is relatively large and ions are allowed to enter the beam only in sufficient numbers to enable the beam to pinch to about 1 mm. diameter. During the latter portion of travel, which is through the anode, the beam is contained in a portion of the cylindrical element that is of much smaller diameter than that of said relatively larger diameter portion. By any of several methods, sufficient additional ions are introduced into the beam where it is traveling through the tubular anode, to further pinch the beam progressively more and more as the beam penetrates farther into the anode until it has pinched to 0.1 mm. radius where the beam has deeply penetrated into the anode and is approaching the target. By any of several methods, heavy element ions (of an element having an atomic mass above 40) are attracted into the beam to form a cluster of much more than $10^8$ of such heavy ions, which transiently causes the beam to pinch locally where the cluster is gathering so that the beam both concentrates the cluster and accelerates it in the direction of electron flow. As the beam pinches to a smaller radius, the cluster is also concentrated to a smaller diameter. The decrease in beam radius increases the high energy electron current density resulting in the heavy ions being stripped more and more of their electrons. As the high energy electrons in the beam pass the cluster, the increase in positive space charge due to the cluster attracts the beam electrons towards the axis of the beam thereby producing a local increase in negative space charge at and ahead of the cluster which both concentrates and accelerates the cluster. The more nearly completely stripped heavy ions in the cluster are more firmly held in the potential trough at the head of the cluster, and the less stripped ions are able to lag behind and be lost. Thus the cluster is self-purging and keeps the most highly stripped ions while at the same time accelerating them the most strongly. As will be discussed in more detail later, the production of a cluster of a species of heavy ions moving at the same velocity as the high energy electrons in the beam, and directing the cluster into a solid state target of an element of high atomic number, produces collisions between cluster ions and target nuclei whose showers of subnuclear products are slanted very much in the forward direction. Because of the very high density of the cluster and of the target nuclei, the showers of these collisions near the front of the target overlay the collisions occurring further downstream while these collisions are going on, so that the collision processes are cascaded exponently with deeper penetration into the target.

DETAILED DESCRIPTION OF THE INVENTION

Figure 11:
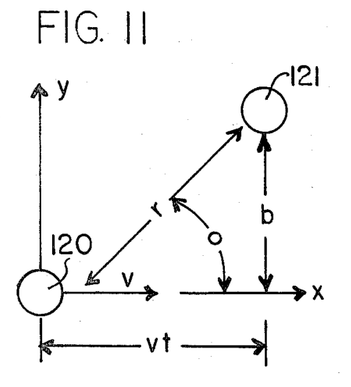
FIG. 11 is a diagram illustrating the collision between an alpha particle and an electron in a dense medium.

An understanding of the basic physical principles involved in this invention can be obtained by beginning with the method first proposed by Niels Bohr in 1911 for explaining the stopping power of matter for alpha particles. In FIG. 11, a positively charged alpha particle, 120, is moving at a velocity v in the x-direction and passes an electron, 121, at a closest distance, b. While the charged particles are at a distance apart, r, the force between them is the Coulomb force, the magnitude of which in c.g.s. units is $$F = Z e^2 / r^2.$$

The y-component of this force when the distance r is at an angle $\phi$ from the line of motion of the alpha particle, is $$F_y = (Z e^2 / r^2) \sin \phi.$$

The y-component of the momentum, $p_y$, given the electron when the alpha particle passes it is $$p_y = \int_{\text{duration of passage}} \frac{Z e^2}{r^2} \sin \phi \, dt.$$

Integrated through the duration of the passage $$p_y = \int_0^\pi \frac{Z e^2}{v b} \sin \phi \, d\phi = \frac{2 Z e^2}{v b}.$$

The kinetic energy given the electron due to this momentum, is $$p^2_y / 2m = 2 Z^2 e^4 / m v^2 b^2$$

The energy given each electron and ion during the passage of the alpha particle is equal to the square of the impulse, $p_y$, divided by twice the mass of the electron or ion, and, because the mass of an ion is so much greater than that of an electron, the energy given an ion can be neglected compared with the energy given an electron at the same distance from the line of flight of the alpha particle.

The energy given the electrons while the alpha particle travels a distance $\Delta x$ $$\Delta E = \int_{b_{min}}^{b_{max}} \frac{2 Z^2 e^4}{m v^2 b^2} n \, 2\pi \, b \, db \, \Delta x$$

and the space rate of energy loss by the alpha particle (which may be called the "stopping power") is $$\frac{dE}{dx} = \frac{\Delta E}{\Delta x} = n \frac{4\pi Z^2 e^4}{m v^2} \int_{b_{min}}^{b_{max}} \frac{1}{b} db =$$

$$n \frac{2\pi Z^2 e^4 M}{m E} \log \frac{b_{max}}{b_{min}}.$$

An approximate value for the nearest distance of approach of the alpha particle to an electron, $b_{min}$, can be obtained by noting that even in a head-on collision of an electron with the alpha particle having a velocity, v, the maximum velocity the electron can be given is about equal to 2v. The maximum energy the electron can acquire is $$E_{max} = Z^2 e^4 / m v^2 b_{min}^2.$$

Equating and solving for $b_{min}$ gives $$b_{min} = Ze^2 / 2E.$$

A value for the greatest distance from the line of flight of the alpha particle $b_{max}$ to which interaction must be considered is not so simple to estimate but it must be not less than the distance at which the electron is separated by ionization and not greater than the distance at which the electron can absorb vibrational or other internal energy irreversibly. Writing this energy as X, and the kinetic energy of the alpha particle as E:

$$E_{min} = X = \frac{Z^2 e^4}{E \cdot b_{max}^2} \text{ or } b_{max} = \frac{Z e^2}{\sqrt{XE}}.$$

The logarithmic term can be written as $$\log(b_{max}/b_{min}) = \tfrac{1}{2} \log(4E/X).$$

The range of an alpha particle with initial energy $E_0$ can be obtained from $$\int_0^{R_0} 2E \frac{dE}{dx} dx = \int_0^{R_0} \frac{2\pi n Z^2 e^4 M}{m} \left( \log \frac{4 E_0}{X} \right) dx$$

where E under the logarithm has been replaced with $E_0$ because the logarithm is rather insensitive to the small decreases in E over most of the range of x in the integration.

$$R_0 = \frac{m E_0^2}{2\pi n Z^2 e^4 M \log \frac{4 E_0}{X}}$$

gives the range of the alpha particle.

The experimentally observed range of a 5 MeV alpha particle in copper is 0.0071 cm, so the average electric field which must be exerted on the alpha particle to stop it in 0.0071 cm is 706,000,000 volts cm$^{-1}$.

There is an alternative point of view that can be used for calculating the stopping power of matter for alpha particles. In this method, it is recognized that each electron in the medium is displaced towards the line of flight of the alpha particle during the passage of the alpha particle. Because the electron is progressively nearer the line of flight, the component of the force of attraction between the electron and the alpha particle parallel with the line of flight, is greater after the alpha particle has passed the electron than before; and consequently, the electrons at any given distance behind the alpha particle are pulling back on the alpha particle with a greater force than the electrons at the same distance in front of the alpha particle are pulling forward on the alpha particle. Detailed calculations have been made of this retarding force and, of course, the stopping power is found to be the same as that derived using Bohr's method of calculating the energy transfer from alpha particle to electrons.

The displacement of the electrons towards the line of flight produces an increase in density of electrons behind the alpha particle and this produces a potential well whose depth is proportional to the charge on the alpha particle, or stated in another way, the increase in electron density exerts an electric field on the alpha particle which is proportional to the charge on the alpha particle. The force on the alpha particle is proportional both to that electric field and also to the charge on the alpha particle so that the force on the alpha particle is proportional to the square of Z. For this reason, the interaction of the alpha particle with the medium is said to be "coherent".

The above considerations can be extended to the case where the alpha particle upon entering the solid state material is traveling at a velocity approaching the velocity of light and the relationships in Einstein's theory of relativity must be used. The force exerted by the alpha particle on an electron has a component perpendicular to the line of flight of the alpha particle given by $$F_y = \gamma Z e^2 b / (\gamma^2 v^2 t^2 + b^2)^{3/2}$$

where the time is measured from the instant that the alpha particle is at the position of nearest approach, b is the distance of nearest approach, $\gamma$ is $$\gamma = (1 - v^2/c^2)^{-\tfrac{1}{2}}$$

where v is the velocity of the electrons in the beam. (See Chapter 8 of "Special Relativity" by A. P. French, Norton and Company, 1966). Integrating the force $F_y$ with respect to time gives the momentum given the electron as:

$$p_y = 2Ze^2 / vb$$

which turns out to be the same value it was found to have in the non-relativistic case.

With those facts and magnitudes in mind, let us examine the situation when a concentrated cluster of N ions (orders of magnitude of $10^8$ to $10^{12}$ ions) of a heavy element, say mercury, atomic mass, M, is contained within an intensely pinched (order of $10^{-2}$ cm radius) 100,000 ampere beam of 5,000,000 volt electrons.

In a steadily running pinched beam of high energy electrons including even the highest attainable energies of electrons, the space charge must be at least partially neutralized by ions, else the beam diverges and is not pinched. If the ion velocities are very much smaller than the electron velocities, the density of the ions is correspondingly smaller. The electron density is $$n_1 = n_0 (1 + r^2/r_0^2)^{-2}$$

where $n_0$ is the numerical density of beam electrons on axis and $r_0$ is the radial distance within which one half of the beam lies. The ion density in such a steadily running pinched beam is given approximately by $$n_2 = n_1 / \gamma$$

(e.g., see Bennett, Phys. Rev. Vol. 98, {1955}, p. 1588). These expressions are very different as seen by an observer moving with the electrons, to be called hereinafter the "beam observer", (e.g., see McCrea, "Relativity Physics" 4th ed. 1954, p. 46), so that the pinched beam now consists of the ions moving in the reverse direction at the high velocity with some of their positive space charge neutralized by electrons having little or no velocity. In the following, the quantities as seen by the beam observer will be primed and the same quantities as seen by the laboratory observer will be left unprimed. Now to the beam observer it is the ions which have the density distribution $$n_2' = n_0(1 + r^2/r_0^2)^{-2}$$

and the electron density distribution has decreased to $$n_1' = n_2'/\gamma.$$

In the first instance, as seen by the laboratory observer, the tendency of the space charge due to the great excess of electrons to try to expand the beam was overcome by the self-focusing interaction of the velocity of the beam electrons with the self-magnetic ("pinching") field of the electron beam current. To the beam observer, it is seen that the electrons are not longer moving, but the positive ions are moving in the reverse direction so it is the pinching magnetic field of the ions which holds the beam together against the dispersive effect of the positive space charge due to the excess of ions over electrons. This is the same pinched beam as considered before and it must have the same behavior as before, (that is, it must remain pinched and must not disperse) quite without regard to the velocity that any observer might have.

There is a wide variety of ways in which a local increase in positive ions can be introduced into the pinched beam. The local increase which is effective is that portion of the increase in ion density that is smaller in diameter than the pinched electron beam (by virtue of Gauss' theorem), and will be examined from the viewpoint of the beam observer. The local increase can be considered to act like a giant ion incorporated within and superimposed upon the ion beam. If the average degree of ionization of the ions in the giant ion is written as g, the number of positive charges on the giant ion Z is equal to g N where N is the number of ions in the giant ion. Here, as before, the space rate of change of kinetic energy of the giant ion to the beam observer is $$\frac{dK'}{dx'} = n'_1 \frac{2\pi g^2 N^2}{m \, v'^2} \int_{b'_{min}}^{b'_{max}} \frac{1}{b'} db' = n'_1 \frac{2\pi g^2 N^2}{m \, v'^2} \log \frac{b'_{max}}{b'_{min}}.$$

Just as the passage of the alpha particle through the electrons in Bohr's stopping power case pulled the electrons together behind the alpha particle, causing the alpha particle to approach the velocity of the electrons (that is, to slow down) so now, to the beam observer the increase in positive ion density due to the cluster of ions pulls the electrons together behind the cluster, creating a negative potential well, causing cluster ions to collect in the well and to approach the velocity of those electrons, that is, to slow down as seen by the beam observer.

There is a minor distinction that might be mentioned. Before, we calculated the interaction of the alpha particle with the electrons only as far out in radial distance as the distance at which the energy that was given to the electrons exceeded the energy the electrons could absorb irreversibly in that solid state substance. This time there is not such a limit and instead, the integration should be extended to the extent of the radius of the beam, h. For the other limit of the integration, an order of magnitude estimate of the minimum radial distance could be the nuclear radius of one of the ions in the cluster, a. Errors in these estimates occur only in the logarithmic term, make comparatively little difference in the result and need not be over-emphasized.

From the above, it is clear that when a high energy beam of electrons contains and passes a cluster of ions sufficient number and concentration, electrons will be deflected towards (and some of them past) the axis of the beam in such a way as to produce a potential well in which the cluster will concentrate and approach the velocity of the electrons in the beam.

To the beam observer, the distance the giant ion must travel in the electron beam while the velocity of the giant ion decreases to that of the electrons, is the range of the giant ion, $R_0'$. The initial value of the kinetic energy of the giant ion as seen by this observer is $$K_0' = (\gamma - 1)NMc^2$$

where N is the number of ions in the cluster, M is the rest mass of each ion in the cluster, and N M is the rest mass of the cluster. To the beam observer, the rate of change of energy of the cluster with respect to the velocity of the cluster is $$dk'/dv' = NMv'(1 - v'^2/c^2)^{-3/2}.$$

Proceeding as before in the non-relativistic case, using the method of Bohr, from the change in the kinetic energy of the giant ion $\Delta K'$, going a distance $\Delta x'$ we have $$\frac{dK'}{dx'} = \int_{b'_{min}}^{b'_{max}} \frac{2 g^2 N^2 e^4}{m \, v'^2 b^2} n'_1 2\pi b' \, db' = n'_1 \frac{4\pi g^2 N^2 e^4}{m \, v'^2} \log h/a.$$

The range of the giant ion, $R_0'$ as seen by the beam observer can be estimated from $$\frac{dx'}{dv'} = \frac{dK'}{dv'} \bigg/ \frac{dK'}{dx'} = \frac{N M v'}{(1 - v'^2/c^2)^{3/2}} \frac{m \, v'^2}{n' \, 4\pi g^2 N^2 e^4 \log h/a}$$

$$= \frac{M m}{n'_0 \, 4\pi g^2 N e^4 \log h/a} v'^3 (1 - v'^2/c^2)^{-3/2}$$

and the range of the cluster as seen by the beam observer is $$R'_0 = \int_v^0 \frac{dx}{dv} \, dv =$$

$$\frac{M \, m \, c^4}{n'_1 \, 4\pi g^2 N e^4 \log h/a} \left[ \left(1 - \frac{v'^2}{c'^2}\right)^{\frac{1}{2}} + \left(1 - \frac{v}{c'^2}\right)^{-\frac{1}{2}} - 2 \right]$$

where the constant of intergration must be 2 if the range is to be zero when the initial velocity is zero. This may be written $$R_0' = (Mmc^4/n_0' 4\pi g^2 N e^4 \log (h/a))(\gamma^{\frac{1}{2}} - \gamma^{-\frac{1}{2}})^2.$$

The density of the electrons, $n_1'$ to the beam observer is the same as the density of the ions, $n_2$ to the laboratory observer, before, and is $$n_1' = n_2 = I/\pi \gamma a^2 ec.$$

To the laboratory observer, the range is $$R_0 = \frac{1}{\gamma} R'_0 = \frac{M m c^4}{4\pi g^2 N e^4 \log h/a} \left(\frac{\pi \gamma a^2 ec}{I}\right) \frac{(\gamma^{\frac{1}{2}} - \gamma^{-\frac{1}{2}})^2}{\gamma}$$

$$= \frac{M m c^5 a^2}{4e^3 I g^2 N \log h/a} (\gamma^{\frac{1}{2}} - \gamma^{-\frac{1}{2}})^2.$$

For a 100 KA 5 MV electron beam of radius 0.1 mm, containing a cluster of $10^9$ mercury ions whose average degree of ionization is at least 15, and moving inside a cylindrical anode tube (which might be more or less tapered for other reasons to be discussed later), the range within which the mercury ions in the tiny cluster each attain an energy of $2 \cdot 10^{12}$ eV is less than 1.28 cm.

The length of time it takes the beam to bring the cluster up to $\gamma$ as seen by the beam observer is approximately $$\tau' = R_0'/c$$

which to the laboratory observer is $$\tau = \gamma\left(\tau' + \frac{R'_0}{c}\right) = \gamma\left(2\frac{R'_0}{c}\right) = 2\gamma^2 \frac{R_0}{c} = 8.5 \text{ ns.}$$

The energy given the cluster is $$(\gamma - 1) N M_{Hg} c^2 = 162 \text{ joules}.$$

Because the ions are undoubtedly kept at least half stripped by the high density of 5 MeV electrons passing through the cluster, the number of ions in the cluster should be made correspondingly smaller and the energy is similarly smaller whereas the energy available in the 40 ns beam pulse of 100 KA at 5 MV is about 20,000 joules and is far more than adequate.

Using the non-relativistic formula for the range of protons in lead:

$$R = \frac{m K_0^2}{2\pi e^4 M n \log h/a}$$

where M is the mass of the proton and n is the density of electrons in lead, the value of log (h/a) for a 88 MeV proton whose range in lead is 1 cm can be found to be:

$$\log (h/a) = m E_0^2 / 2\pi e^4 M n R_0 = 15.$$

For the range of a fully stripped mercury ion at $\gamma = 9$ in lead:

$$R_0 = \frac{m(\gamma - 1)^2 M c^4}{2\pi e^4 g^2 n \log h/a} = 15 \text{ cm}.$$

where n is the density of electrons in the solid lead target, and M is the mass of the mercury ion.

This value for $R_0$ is probably high because the value of h under the logarithm is probably much higher for the mercury ion with 80 charges than for the proton with only one, but of course the radius of the mercury ion is also larger than that of the proton.

From the cross section of the lead nucleus for scattering neutrons, the effective radius of the lead nucleus is about $2.4 \cdot 10^{-13}$ cm. The mercury ions should have a radius approximately equal to this so the collision cross-section for collisions between mercury and lead nuclei should be about $0.72 \cdot 10^{-24}$ cm$^2$. Thus, 91% of the mercury ions suffer shower-producing collisions within the first centimeter of travel and the mercury ions will lose less than 10% of their energy before 90% of them will have shower producing collisions with lead nuclei. When such a high energy mercury ion collides with a lead nucleus in the target, each nucleon in the mercury ion produces a shower containing protons, neutrons, the various kinds of mesons and hyperons all of which are directed nearly in the same direction as the mercury ion had before impact, and these diverging products from each entering nucleon in each mercury ion increasingly overlap and mix with those collisions occuring a little further into the target between other mercury ions and other target nuclei. The resulting cascading of the density of the various collision products actually entering into the collision process of the later mercury ions with lead nuclei has of course never been observed before in human experience, but it is obvious that the result includes physical processes and the production of kinds and quantities of products never observed before.

In order to accomplish the production, concentration and acceleration of an ion cluster, there are some restrictions upon the conditions which must be met. There is a wide variety of ways in which the ions can be collected in the relativistic beam and in which the cluster can be concentrated, a variety of designs which can be used for the anode through which to project the beam while it is concentrating the cluster and accelerating it towards the target and a variety of methods for controlling the supply of ions to the various positions along the beam in order to control the diameter of the beam properly at the various positions in order to accomplish the above. The adjustments of the controllable variables in the system which must be made experimentally and measured include the following:

1. The supply of ions to the forming beam in the main gap must be restricted to avoid pinching the beam to less than about one mm during a rise-time of the pulse of about 5 ns, or the induced back emf in the discharge circuit would approach all of the voltage available from the machine, and the beam would not form. Instead, a lateral discharge or arc-cover occurs somewhere back along the cathode support or within the machine.

2. The ion supply to the beam near the cathode tip and in the main gap between the cathode tip and the front of the anode must be restricted to concentrate the beam to not less than about one mm while the cluster gathers and is accelerated, at first relatively weakly, across the main gap.

3. The design and composition of the front of the anode must be such as to avoid arc-over, and also the diameter of the anode into which the beam is directed should be reduced progressively towards the target position. The ion supply to the beam must be so arranged as to increase the density of ions in the beam with increasing depth of penetration of the beam into the anode in order to pinch the beam to the desired radius of the order of 0.1 mm while avoiding overpinching en route. The progressive reduction of the diameter of the tubular anode must be kept approximately proportional to the reduction of the diameter of the beam in order to minimize fluctuations in the self-inductance along the beam towards the target. The objective of course is to concentrate the beam to the order of 0.1 mm which concentrates the cluster to less than that.

4. The continual projection of a 100 KA beam of 5 MV electrons through the assembling cluster particularly where the cluster enters the tubular anode and the radius of the cluster approaches 0.1 mm provides a current density of the order of $3 \cdot 10^8$ amp cm$^{-2}$ and this will strip mercury ions in the cluster to more than 15 degrees of ionization. In this event, the beam will be concentrated at the front of the cluster and some of it will be scattered laterally into the wall of the tubular anode. This tends to deliver much of the energy of the beam to the cluster. In any pinch discharge there is a self-purging action which allows the less firmly held components to leave the beam and in this case, the cluster most strongly retains the most highly stripped ions.

Figure 1:
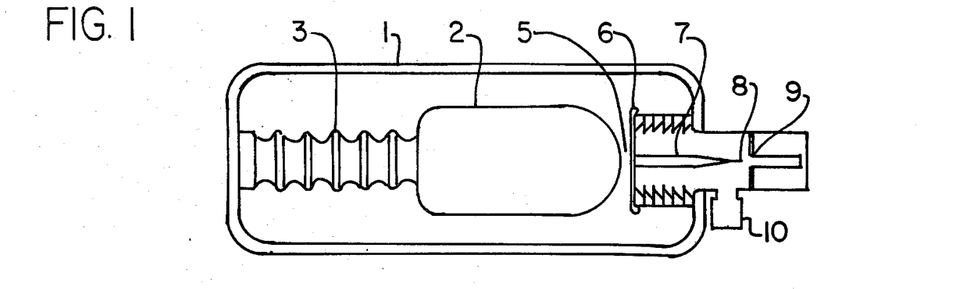
FIG. 1 is a schematic drawing of one form of the invention.

In FIG. 1, the generator is contained in a high pressure tank 1, containing a high pressure insulating gas mixture at least a part of which is a gas such as sulphur hexafluoride which is a particularly good insulator. A high voltage electrode 2 is supported on an insulating column 3 similar to those used in the belt-type electrostatic high voltage ion accelerators usually referred to as van de graaff accelerators. The high voltage electrode 2 is charged with a charging belt. As soon as the high voltage electrode 2 has attained a sufficient negative high voltage, a spark-over is induced at gap 5 to connect the high voltage electrode 2 to the high voltage electrode 6 of the diode. Supported on the diode high voltage electrode 6 is a cathode support 7, on the other end, 8, of which is supported the cathode from which electrons are emitted towards the anode assembly 9. The entire diode is kept evacuated to a good vacuum by means of a vacuum pump 10. The above kind of high voltage generator is described by S. Graybill, H. Lackner, and S. V. Nablo in the proceedings of the Electron and Laser Beam Symposium, pp. 175-189, edited by A. B. El-Kaneh, held at Pennsylvania State University, Mar. 31-Apr. 2, 1965, in an article entitled "Magnetic Pulsed Electron Beam Techniques". The diode assembly to be used in the practice of this invention will be described in more detail later in the following.

Figure 2:
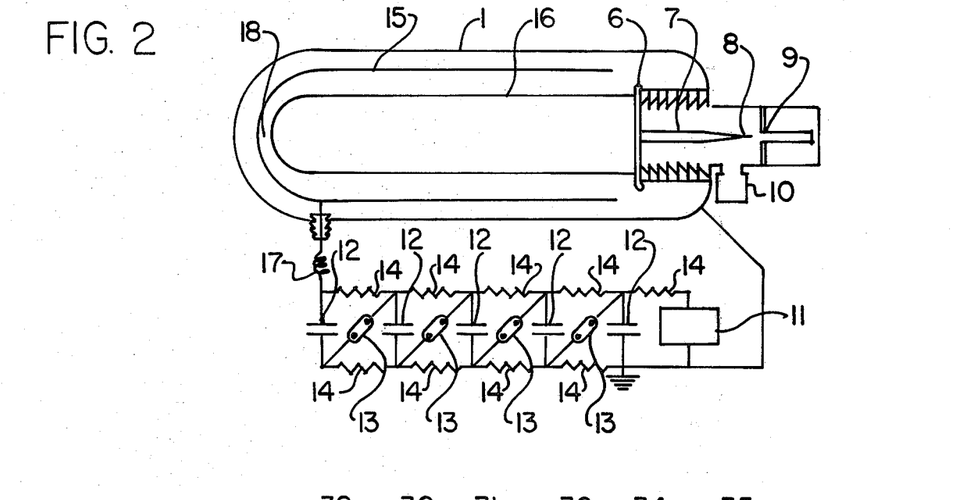
FIG. 2 is a schematic drawing of another form of the invention.

FIG. 2 has diode elements 6, 7 and 8, and pump 10 the same as in FIG. 1.

In FIG. 2, is illustrated an alternative kind of high voltage generator which is described in some detail in my U.S. Pat. No. 3,510,713. In this apparatus, a high voltage D.C. supply 11 charges condensers 12, 12 . . . 12 in parallel to a positive potential until the spark gaps 13, 13 . . . 13 spark over. The resistance of the resistors 14, 14 . . . 14 is sufficient to effectively isolate the condensers except for their being connected in series by the discharges through the spark gaps so that a high voltage is suddenly connected through the inductance 17 to the intermediate electrode 15 inside the tank 1. The tank usually contains transformer oil as the insulating medium. As soon as the electrode 15 has attained nearly the full voltage of the stack of condensers, a spark-over occurs at 18 between the electrodes 15 and 16. The discharge of the electrode 15 induces a negative potential on the inner electrode 16 which raises the potential of the high voltage electrode 6 of the diode to a high voltage and produces a discharge in the diode assembly. As mentioned in the above, the diode, which may have many different forms and compositions, will be discussed in more detail in the following.

In the following discussion of the discharge diode portion of the equipment will be described various forms of cathodes, various forms of anodes, and various forms of connections between the anode and the wall of the diode which surrounds the cathode support. In FIGS. 3, 4, 5, 6, 7 and 8 are shown only certain combinations of cathodes, anodes, and wall connections, but those are only illustrative and this invention is by no means limited only to those combinations but also includes not only any other combinations, but also many other detailed forms of attachments, interconnections and configurations.

Figure 3:
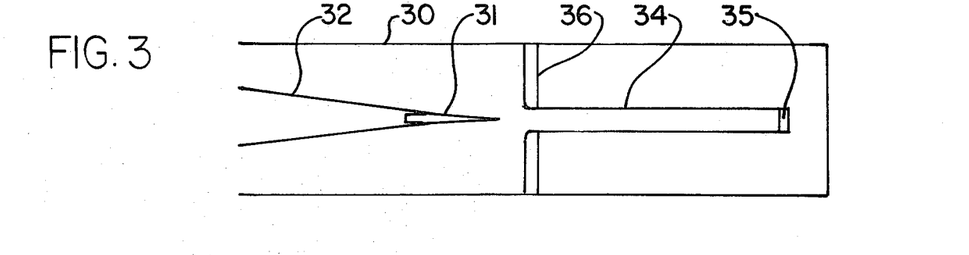
FIG. 3 shows the diode portion of another form of the apparatus comprising the invention.

Reducing the beam radius to less than one-tenth millimeter is not just a matter of degree but indeed is the threshold concentration of the intense relativistic electron beam which must be passed in order to enable the electron beam coherently to accelerate bunches of the order of $10^8$ to about $10^{12}$ ions to very high energies, with target material as needed for each of a great variety of kinds of applications. In FIG. 3 is shown a long, slim tapered dielectric caathode 31 held at the larger base end by a metallic cathode holder 32 which is a part of the cathode support 7 in FIGS. 1 and 2. The anode 34 is a conducting tube, either metal or a substance like graphite, flared out at the end towards the cathode and supported near that end by a support 36, which may be either a dielectric or a high resistivity material made by compressing a finely divided dielectric powder with a substance like graphite. There are many other electrically resistive materials which may be used and are well-known to those skilled in the art. At the other end of the anode is shown a target material 35. The entire diode assembly is located inside the cylindrical diode envelope 30 which is kept evacuated with vacuum pumps as illustrated in FIGS. 1 and 2. The sudden application of very high voltage to the cathode support produces an increasing discharge current along the surface of the dielectric cathode which will be in fine jagged filaments over the surface except where the cathode is made small enough in diameter (order of a millimeter or less) in which event the discharge takes the form of a more diffused plume over the cathode surface. This latter is desirable for producing reproducible and well directed electron beams having the end of the cathode towards the anode. The surface of the support 36 is rendered conducting both by bombardment by electrons from the cathode and also by dielectric surface breakdown due to the voltage to which the anode is raised by virtue of the arrival to electrons from the cathode. It is preferable to use methods for making the connection conducting which do not rely upon surface breakdown because such breakdown tends to be streamering in character and does not readily retain good cylindrical symmetry for the current. The electron beam from the cathode cannot pitch below the order of one millimeter between the cathode tip and the front of the anode because of un-neutralized space charge in the beam but upon entry into the anode 34, the increase in ion supply enables the beam to pinch on down to the order of one-tenth millimeter before striking the target 35.

Figure 4:
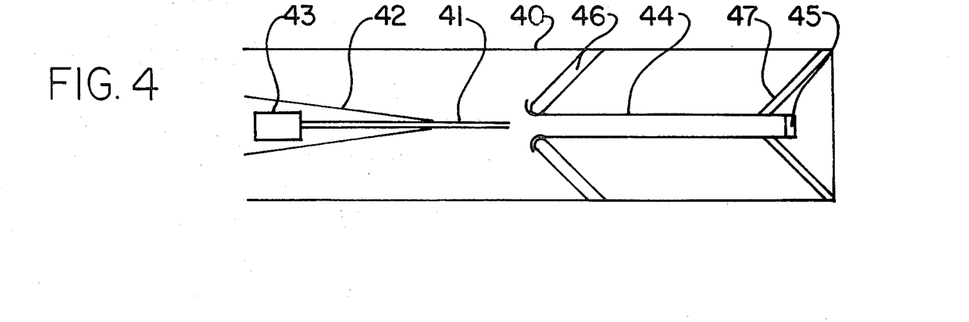
FIG. 4 illustrates another form of diode portion for the apparatus of the invention.

In FIG. 4 is shown a cathode 41 consisting of a tube of dielectric about a millimeter or less in diameter connected to a very slow source of gas 43 (held inside the cathode holder 42) to supply the ions to the beam. The end of the anode 44 is supported by dielectric support 46. Shown also is a resistive support 47 at the other end of the anode which may or may not be omitted from this design depending upon the promptness with which it is desired to initiate the discharge to the diode wall 40. The target material is at 45.

Figure 5:
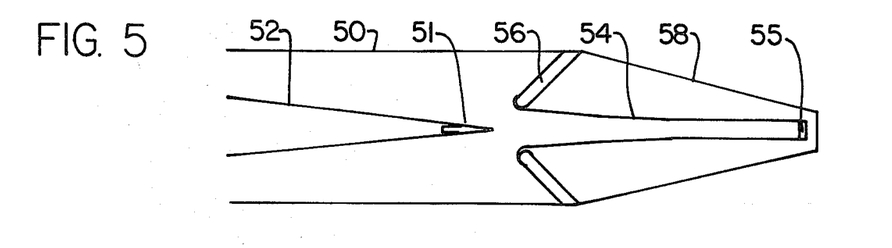
FIG. 5 shows still another form of the diode portion of the apparatus.

In FIG. 5 is shown an envelope 50 and a cathode support 52. A cathode 51 which may be either metal or dielectric and may be shorter than that shown in FIG. 3. This is to emphasize that the length, sharpness, and material to be used in the cathode can vary widely, and the best form depends upon the other components present in the system. The anode 54 is not necessarily nor even desirably in the form of the frustrum of a cone but may be tapered in a manner that reduces diameter more or less rapidly near the end towards the cathode than in the end towards the target 55. The end of the anode may be formed smoothly over the end of the support 56, which may be either a dielectric or a highly resistive material. It is convenient to taper that portion of the diode wall 58 extending over the anode as shown at 58.

Figure 6:
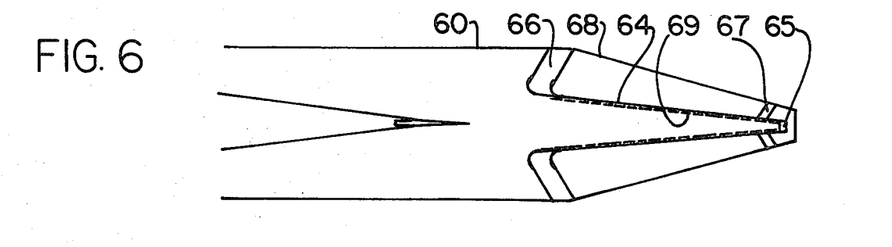
FIG. 6 shows still another form that the diode portion of the apparatus may take.

In FIG. 6 is shown an envelope 60 and a tapered anode 64 with a source of ions comprising a thin coating of material 69 shown with dotted lines on the inside surface of the anode 64. The anode support 66 again may be of dielectric or of resistive material. At the other end of the anode is shown a resistive support 67 which in most instances should be left out. The target 65 is preferably of the same heavy metal as the coating 69.

Figure 7:
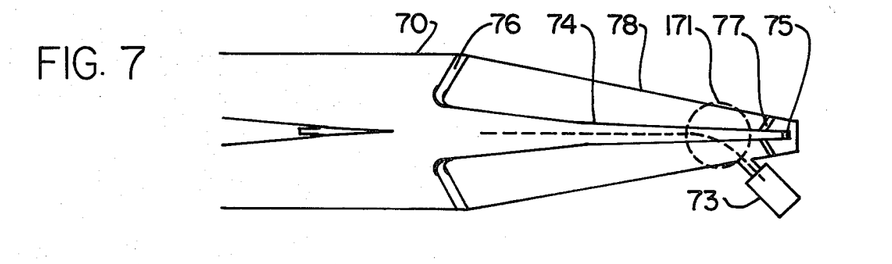
FIG. 7 shows an additional form of diode element for use with the invention.

In FIG. 7 is shown an arrangement in which a positive ion beam is projected from the source 73 and deflected by a magnetic field produced by a magnet, the pole faces of which are shown end on by 171. The magnetic field deflects the low energy positive ion beam on to the axis of the diode and towards the cathode as shown with the dotted line. The device includes envelope 70, support 76, tapered anode 74, 78, anode 75, and resistive layer 77.

Figure 8:
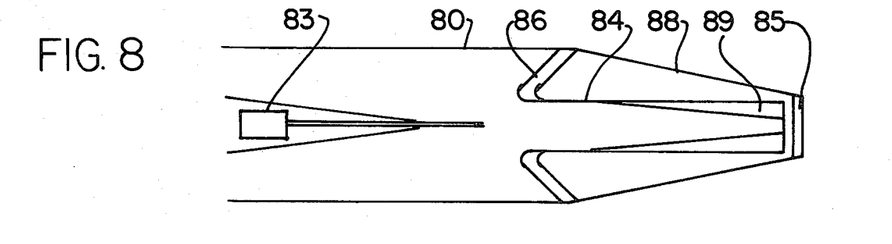
FIG. 8 is yet another form of diode portion for the apparatus embodying my invention.

In FIG. 8 is shown an arrangement wherein the tapered anode may be replaced with a cylindrical anode 84 as shown previously in FIGS. 3 and 4 but with a covering of either dielectric or conducting material of cross-sectional shape such as shown at 89 is introduced. If 89 is a non-conducting material, it is rendered conducting by being radiated by the strong X-rays resulting from electron impact and also is made conducting directly by the electron impact. The envelope 80 carries support insulating element 86 which supports anode 84, 88, and target 85. Source of ions 83 feeds ions into the electron stream from the cathode 82.

Figure 9:
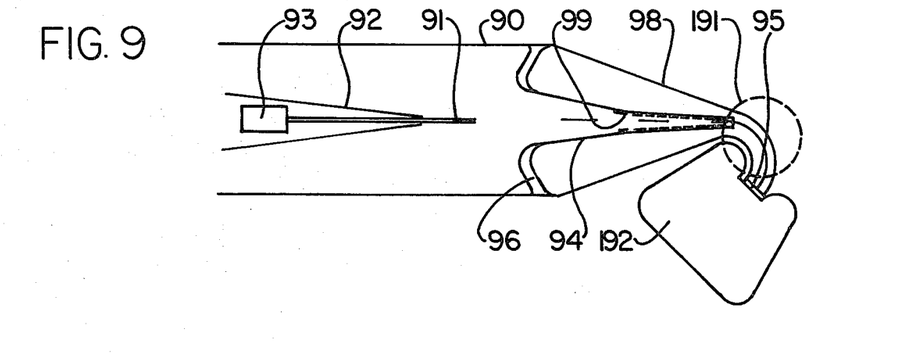
FIG. 9 is a schematic diagram of one form of apparatus for producing thermonuclear power, according to the invention.

In FIG. 9 is shown schematically an arrangement appropriate for the production of power by nuclear fusion or with a proper change in the target material, for the propulsion of space craft including very large and heavy space craft. Any of the cathode assemblies can be used although the one shown is similar to that in FIGS. 4 and 8. Any of the anode and support assemblies can be used although the one shown is like those in FIGS. 5 and 6. There is shown with dotted lines still another location of ion coating 99. A bulkhead is shown at 192 in order to protect the discharge tube and pulse generator from the effects of the blasting of the targets at 95. A magnet 191 is used for bending the electron beam around to strike the target 95 on a portion of the bulkhead which protects the beam generating equipment. In front of the target position would be the equipment for receiving the high energy blast material and converting the energy into a useful form in ways well-known in the art. One such method, for example, is to heat the fluid used to drive turbines with which electric power can be produced. Alternatively, the target position can be at the surface of a space craft so that with the proper target materials the momentum in the blast material reacts to propel the space craft. If this kind of system is to be used in the production of matter of atomic mass much above any naturally existing or heretofore manufactured, appropriate material as discussed in my previous U.S. Pat. Nos. 3,516,906 and 3,526,575 is to be used as target material 95, and the space surrounding the target must be enclosed in order to collect the products of the nuclear reactions produced by impact of the beam by nuclear fusion in the materials in the target. Envelope 90 carries support 96 for anode 94, 98, and surrounds cathode 91, its support 92 and a source of gas 93.

Figure 10:
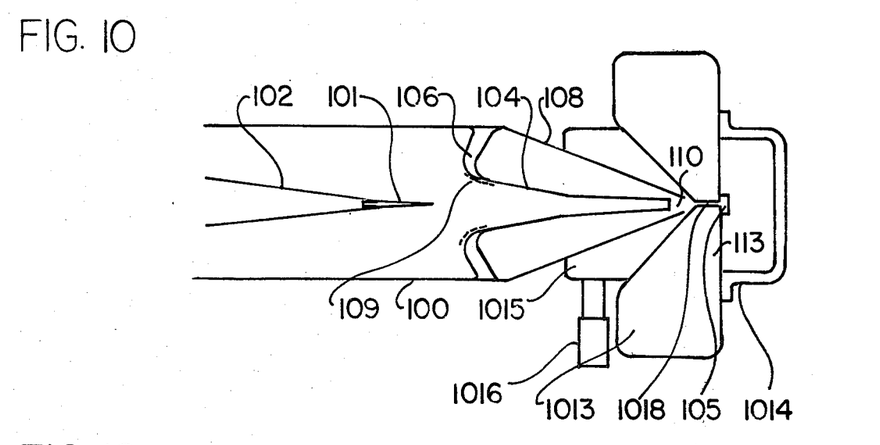
FIG. 10 is a schematic diagram of an apparatus, whereby the products of accelerating clusters of ions to very high energies into a target can be collected and purified.

In FIG. 10 is shown an arrangement which can be used in producing and using coherently accelerated clusters of ions. Any of the kinds of cathode assemblies can be used in place of 101 and 102. Any of the anodes can be used in place of 104 and any of the anode supports can be used at 106. Shown in this particular arrangement with dotted lines is a coating 109 from which the desired kind of ions can be produced in the beam channel from material resulting from electron impact early in the pulse. The various interacting characteristics of the parts of the diode are so adjusted as to enable the beam to concentrate the desired ions into a finely concentrated cluster, to accelerate the clusters to near the velocity of the electrons in the beam, and to deliver the cluster through the small aperture 110 in the end of the envelope 108. The space 1015 is evacuated by a powerful pump 1016. The highly energized and concentrated cluster then travels through a small aperture 1018 through the massive bulkhead 113 and strikes the target material 105. A containing vessel 1014 surrounds the target for most applications. If the material in the ion clusters and target are selected to produce energy by nuclear fusion, the container 1014 is equipped with means for putting the liberated energy into the driving fluid for the turbine or otherwise to convert the liberated fusion energy into useful power. If the cluster and target are selected to produce transuranic elements, the container 1014 collects the products which are then dissolved or otherwise removed for processing. Similarly, the container 1014 is equipped to collect and process the products for such other applications where the material or energy are of interest. On the other hand, if the system is to be designed to produce propulsive force for space vehicles, the pumps at 1016 and for the diode need not be used nor does the container 1014 need to be used of course, but only it is necessary to vent the spaces 1015 and in the diode directly through the walls of the space vehicle to the space outside.

The apparatus of FIG. 10 operates as follows:

The cathode tip 101, of cathode 102, emits a short pulse of say 40 nanoseconds. This pulse builds up the first few nanoseconds, and as it does so, a self-magnetic field is built up around it. In the early stages of the build-up of this pulse, it is not highly concentrated and some of the electrons of the beam strike the wall 104 and knock loose some gases of the coating 109 on the metal wall 104. The coating 109 on the wall 104 is made of a material having an atomic number above 40 and preferably above 70. The self-magnetic field which is being built up is limited in cross-section by the outer wall 100 (which is made of current conducting material). This self-magnetic field concentrates the beam and reduces it to a diameter of about 1 mm. As the current in the beam continues to rise, the gas knocked loose from coating 109 proceeds towards the axis of the beam.

As soon as the density of the gas has risen to a sufficient value, the beam will be pinched down to a radius of about 1 mm. The gases from the wall must then ionize and neutralize the space charge at the beam inside the tubular anode 104 before it will pinch down to 0.1 mm. radius. The ions behind this increase are at this moment accelerated forward. If they go forward too fast they would get ahead of the electron bunching and drop back. Hence, the ions tend to remain in a cluster during each pulse. Stated another way, the beam has places where the electrons are more concentrated than they are in other places. If the ions associated with one of the more concentrated portions of the electron beam are accelerated faster than the electrons, they approach a rarified area and slow up. Thus, the ions remain in clusters.

As the pulse of the beam continues to flow, it accelerates this cluster of ions to the velocity of the electrons, whereby the ions in the cluster will have very high energies. The ions then strike the target 105 which then produces clusters of showers of sub-nuclear particles in the target 105. These showers are so intense that a shower results from each ion and the many showers emitted overlap in both space and time resulting in a high energy concentration in chamber 1014. Energy in the form of heat may be extracted from this chamber.

The target 105 may be made of the same heavy metal (atomic number above 70) as the coating 109 of the current return element 104.

In FIG. 10, the return path for the electrons comprises anode 104, bulkhead 1018, envelope portion 108, envelope 100, and back to cathode support 102. It is noted that just as electrons leave the cathode tip 101, their self-magnetic field may extend to the full diameter of envelope 100. However, as the electrons enter the anode, the inner wall 104 is much smaller in diameter (narrower) than that of envelope 100. It is the above-described narrowing of the space around the electron beam, which in conjunction with the addition of ions in or adjacent the narrowed area, that results in the second and final pinching of the beam. It is this action that narrows the beam to 0.1 mm., radius, and produced ion clusters that are accelerated to the desired energies for production of fusion and/or showers. The action described in this paragraph, in conjunction with FIG. 10, is also true for each of the other forms of the invention, with such modifications in wording as are necessary in order to apply to those forms.

It would be impractical to try to describe in detail all of the methods for injecting heavy ions into the relativistic beam with which to form a cluster, or all of the designs which can be used for the anode into which to project the beam for concentrating and accelerating the cluster, or all of the methods for controlling the supply of ions to each of the portions of the length of the beam in order to control the diameter of the beam properly at the various positions along the extent of the beam. In order to understand the various configurations and magnitudes as well as the inter-relationships and trade-offs that can be invoked, a particular form and operation of the equipment will be discussed in the following.

Figure 12:
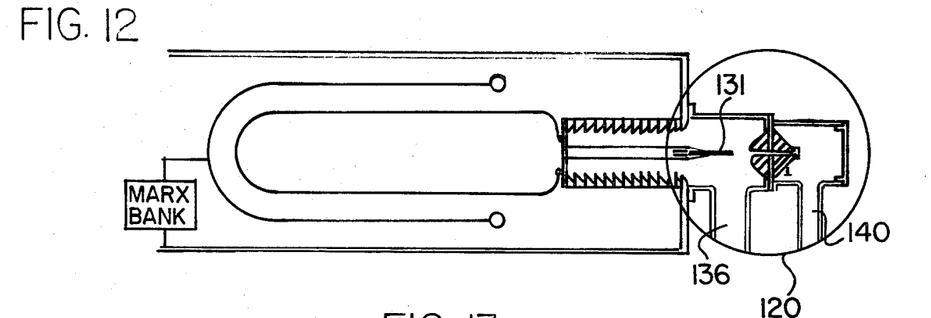
FIG. 12 is a schematic drawing of one form of the invention.
Figure 13:
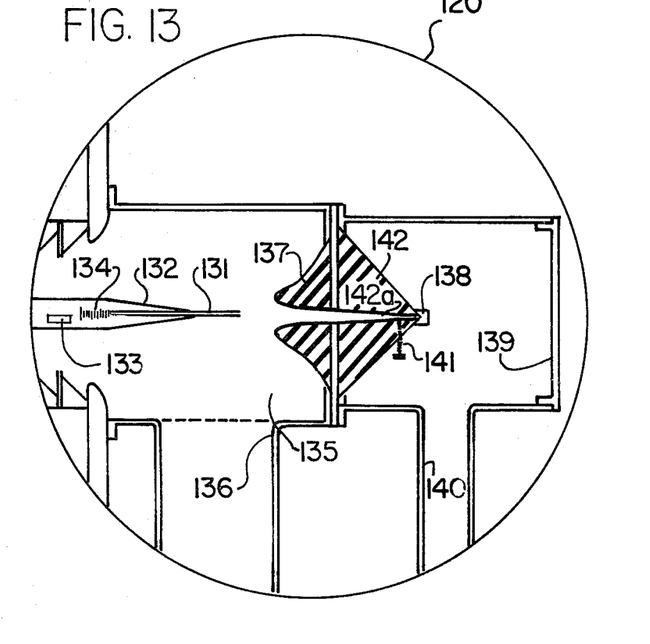
FIG. 13 is an enlarged view of the discharge portion of the form of the invention shown in FIG. 12. The apparatus surrounded by the circle 120 in FIG. 13 corresponds to the apparatus in the circle 120 of FIG. 12. The circles 120 in and of themselves do not represent any structure but simply constitute a convenient way of showing that FIG. 13 is an enlarged view of a particular portion of FIG. 12.

In this exemplary arrangement as shown in FIGS. 12 and 13, the cathode is a hollow tube about 1 mm. in diameter and several centimeters long made of high density aluminum oxide or some similar dielectric material, 131, held in a tapered metallic cathode holder 132 along the axis of the high voltage tube as illustrated. A supply of mercury is held in a tray 133 and the flow of mercury vapor out through the tubular cathode is controlled by a valve at 134. The mercury vapor and all other gases are evacuated from this first chamber, 135, through the pumping port 136.

The portion of the anode, 137, nearest to the cathode is shaped to minimize the amount of nearby surface which can be struck directly by electrons from the cathode and cathode holder during the early part of the rise in current in the pulse and so to minimize the likelihood of ions from such impact going directly back to the cathode tip. This nearest portion of the anode may be made of dense, high-density, "reactor-grade" graphite to minimize the gases and ions emerging from that portion of the anode. This reduces the contamination of the mercury vapor emerging from the dielectric cathode and increases the comparative density of mercury ions formed near the cathode and from which the beam will begin to select the most highly ionized mercury ions from which to form the cluster.

The target for the cluster is located at 138 which is in a second chamber, 139, which is pumped through the port 140. The pump for this chamber may be a mercury vapor pump with a vapor trap whose temperature can be held at a value to provide a mercury vapor pressure in this chamber such that the flow of mercury vapor through the valve 141 provides the required supply of ions in the tubular anode to control the pinching in this last part of the beam in order to best concentrate and accelerate the cluster. The valve 141 controls the flow through hole 142a in anode 142.

It should be remembered that rather small variations in the supply of gases and ions from the walls can produce wide variations in the supply of ions to the beam channel and that these variations are greater during the first few shots than later after the tube has been "broken in". To observe and control the ion supply to the various positions along the beam, certain diagnostics can be provided. The several sections of the anode 137, 142, and 138 would be insulated from ground and from each other, and means provided for measuring the time dependence of the current to each during the pulse. The densities and compositions of the gases in the two chambers 135 and 139 would also be measured.

The anode 137, 138 and 142 is composed of dielectric material such as high density aluminum oxide.

I claim:

1. The method of concentrating a beam on a target comprising:

directing a high-energy pulsed beam comprising bursts of electrons, in a first direction, toward the target, pinching said beam for a first portion of its length which portion is spaced from the target, said beam having a self-magnetic field, said pinching being effected by the self-magnetic field around the beam, the improvement comprising:

further pinching the beam, over a second portion of its length which second portion extends from the first portion to the target, by limiting the size of the self-magnetic field around the beam to a smaller cross-section than the cross-section of the first-named field while increasing the atomic ion concentration in the beam so that the small-size cross-section of the self-magnetic field plus the increased ion concentration will cause the beam to be pinched to a smaller cross-section than resulted from the first pinching step, forming clusters of ions in the beam, the concentration of ions in such clusters being increased during said further pinching step, and impacting a target with said clusters of ions to produce a shower of particles.

2. Apparatus for concentrating a beam of electrons, pulse generator means having a first electrode for emitting a pulsed beam of electrons and a second electrode which receives the beam, a return path for the electrons extending from the second electrode to the pulse generator to provide means in which the beam has a self-pinching effect, the improvement comprising:

said return path having reduced cross-section for a limited distance adjacent said second electrode to reduce the cross-section of the self-magnetic field over said limited distance, and means for supplying ions to the beam, thereby further pinching the beam to a cross-section smaller than the cross-section of the beam during the first pinching thereof, said pulse generator and said return path comprising means for providing clusters of atomic ions in the beam with the concentration of ions in the clusters increasing while the beam passes through the reduced cross-section of the return path, and a target positioned to receive the impact of said clusters, to produce a shower of particles.

3. Apparatus as defined in claim 2, in which said means for supplying atomic ions to the beam comprises a coating on said second electrode.

4. Apparatus as defined in claim 2 in which said second electrode has a hole therein to provide said reduced diameter for said limited distance.

5. Apparatus as defined in claim 2 in which said second electrode has a wall defining said hole, said means for supplying atomic ions comprising a coating on said wall.

6. Apparatus as defined in claim 2 in which said means for supplying atomic ions comprises a source of atomic ions and means for feeding the ions into the portion of the return path of reduced cross-section.

7. Apparatus as defined in claim 6 in which said last-named means comprises magnetic means to deflect the ions into said portion of reduced cross-section.

8. Apparatus as defined in claim 2 in which said second element has a dielectric support at its end closest to the first electrode to impair spark-over between the electrodes.

9. Apparatus as defined in claim 2 in which said return path includes a dielectric section therein.

10. Apparatus as defined in claim 2 in which said second electrode includes a target, said target being composed of the same material as said atomic ions.

11. Apparatus as defined in claim 2 in which said second electrode has a hole therein to define said reduced cross-section, said hole having a wall comprising a part of said second electrode, said second electrode having a target at the end of the hole farthest from said first electrode, and a covering of insulating material over a limited portion of said wall adjacent said target.

12. Apparatus as defined in claim 2 comprising a bulkhead, said second electrode comprising a target on a first portion of the bulkhead, said bulkhead having a second portion between the target and said first electrode, and means to deflect the electron beam from the first electrode around said second portion to said target.

13. The method of producing a shower of particles comprising:

providing a target, pinching an electron beam, forming a cluster of atomic ions in the beam, further pinching said beam while concentrating the cluster of atomic ions in the beam, and directing said beam at said target at a beam velocity high enough that the ion clusters will strike the target at a sufficiently high velocity that a shower of particles at the target results.

14. The method of producing a shower of particles at a target comprising accelerating electron beam pulses, toward the target, pinching the beam, adding atomic ions to the beam while further pinching the beam to about 0.1 mm. radius, forming a cluster of atomic ions in the beam and increasing the concentration of ions in the cluster during said further pinching step, the accelerating voltage for the beam being high enough to accelerate the cluster of ions to such a high velocity that it will produce a shower of particles at the target.

15. Apparatus as defined by claim 2 in which said first electrode comprising a cathode for emitting a beam of electrons, said second electrode comprising an anode for receiving the beam of electrons, said anode having a target area for receiving the electrons which target area is transverse to the direction of the beam as it leaves the cathode, means for bending the beam so that it strikes said target area, and a bulkhead at least partially intervening between said target area and said cathode to thereby protect the cathode.

16. An electron discharge device as defined in claim 15 in which said target area is mounted on said bulkhead, whereby the beam is bent around a portion of the bulkhead on its way to the target area.

17. Apparatus for pinching an electron beam comprising:

a cathode that tapers to a beam producing end, for producing an electron beam, said cathode defining a gas outlet hole at its beam producing end, an anode for receiving the beam, means for pinching the beam as it travels from the cathode to the anode, and means for feeding gas out of said hole into the beam so that said atomic ions are introduced into the electron beam to thus enhance the pinching of the beam.

18. Apparatus as defined in claim 17 in which said first-named means comprises a return electron path around the beam for limiting the cross-section of the self-magnetic field of said beam.

19. The method of pinching and focusing a beam of electrons emitted by a cathode toward an anode, the cathode having a gas outlet opening at the place where electrons are emitted therefrom, comprising:

applying high voltage to render said anode positive and said cathode negative, whereby to attract electrons from the cathode to the anode, utilizing the field between the anode and the cathode to pinch the beam, and emitting gas from said outlet into the electron beam to produce atomic ions in the electron beam, to enhance the pinching effect.

20. The method of concentrating a beam on a target comprising:

directing a high energy pulsed pinched beam comprising bursts of electrons, in a first direction, towards the target, the improvement comprising:

forming atomic ion clusters in the beam, adding atomic ions to the beam adjacent the target thereby pinching the beam adjacent the target to a cross-section which is smaller than the remainder of the beam, and impacting the target with said beam after the addition thereto of the ions.

21. The method of concentrating a beam on a target comprising:

directing a high energy pulsed beam comprising bursts of electrons, in a first direction, towards the target, pinching the beam, the improvement comprising:

forming clusters of atomic ions in the beam, adding atomic ions to the beam adjacent the target thereby pinching the beam adjacent the target to a cross-section which is smaller than the remainder of the beam, and impacting the target with said clusters of atomic ions.

22. The method of claim 21 in which the step of adding atomic ions to the beam comprises:

inserting a gas into the beam adjacent the target so that atomic ions from the gas enter the beam.

23. Apparatus for concentrating a beam of electrons comprising:

pulse generator means having a first electrode for emitting a pulsed beam of electrons and a second electrode which receives the beam, a return path for the electrons extending from the second electrode to the pulse generator to provide means in which the beam has a self-pinching effect, the improvement comprising:

said return path having reduced cross-section for a limited distance adjacent said second electrode to reduce the cross-section of the self-magnetic field over said limited distance, and means for supplying ions to the beam; said return path comprising means providing two pinching sections the first one of which is adjacent the first electrode and produces a beam diameter of at least 1 mm at at least one place along the first pinching section, and the second of which is adjacent the second electrode and pinches the beam to at least as small as 0.1 mm radius.

24. Apparatus for concentrating a beam of electrons as defined in claim 23 in which the first electrode is a cathode having a beam producing end and defines a gas outlet opening at said beam producing end, and means for feeding gas out of said outlet so that atomic ions are introduced into the electron beam.

25. The method of concentrating a beam on a target as defined in claim 23 in which the beam is emitted from a cathode having an opening therein, comprising: emitting gas from said outlet into the electron beam to produce atomic ions in the electron beam.

26. The method of concentrating a beam on a target as defined in claim 23 in which atomic ions are added to the beam adjacent the target to increase the atomic ion concentration in the beam.

* * * * *

UNITED STATES PATENT AND TRADEMARK OFFICE
CERTIFICATE OF CORRECTION

PATENT NO. : 4,363,774

DATED : December 14, 1982

INVENTOR(S) : Willard H. Bennett

It is certified that error appears in the above-identified patent and that said Letters Patent are hereby corrected as shown below:

In the "ABSTRACT" line 24, change "$10^8$ to 10 ions" to --$10^8$ to $10^{12}$ ions--;
After the "ABSTRACT" change "26 claims," to --27 Claims,--.
Column 7, line  , change "not" to --no--.
Column 8, line 5, after "ions" insert --of--.
Column 12, line  , change "to" to --of--.
Column 12, line  , change "pitch" to --pinch--.
Column 18, line 50, delete "said".
Column 18, line 53, change "said" to --the--.
Column 19, between lines 33 and 34, insert the following:

27. The method of concentrating a beam on a target comprising:
directing a high-energy pulsed beam comprising bursts of electrons,
   in a first direction, toward the target,
pinching said beam for a first portion of its length which portion
   is spaced from the target, said beam having a self-magnetic field,
   said pinching being effected by the self-magnetic field around the
   beam, to provide a beam diameter of at least 1 mm. at, at least,
   one place along said first portion,
the improvement comprising:
further pinching the beam, over a second portion of its length which
   second portion extends from the first portion to the target, by
   limiting the size of the self-magnetic field around the beam to
   a smaller cross-section than the cross-section of the first-named
   field while increasing the atomic ion concentration in the beam so
   that the small-size cross-section of the self-magnetic field plus
   the increased atomic ion concentration will reduce the beam radius
   to at least as small as 0.1 mm. and thereby cause the beam to be
   pinched to a smaller cross-section than resulted from the first
   pinching step.

UNITED STATES PATENT AND TRADEMARK OFFICE
CERTIFICATE OF CORRECTION

PATENT NO. : 4,363,774
DATED : December 14, 1982
INVENTOR(S) : Willard H. Bennett It is certified that error appears in the above-identified patent and that said Letters Patent are hereby corrected as shown below:

Column 19, line 34, change "23" to --24--.
Column 20, line 20, change "24" to --25--.
Column 20, line 21, change "23" to --24--.
Column 20, line 26, change "25" to --26--.
Column 20, line 31, change "26" to --27--.

Signed and Sealed this

Thirty-first Day of July 1984

[SEAL]

Attest:

GERALD J. MOSSINGHOFF

Attesting Officer     Commissioner of Patents and Trademarks

UNITED STATES PATENT AND TRADEMARK OFFICE
CERTIFICATE OF CORRECTION

PATENT NO. : 4,363,774
DATED : December 14, 1982
INVENTOR(S) : Willard H. Bennett It is certified that error appears in the above-identified patent and that said Letters Patent are hereby corrected as shown below:

In the "ABSTRACT" line 24, change "$10^8$ to 10 ions" to --$10^8$ to $10^{12}$ ions--;
After the "ABSTRACT" change "26 claims," to --27 Claims,--.
Column 7, line 18, change "not" to --no--.
Column 8, line 5, after "ions" insert --of--.
Column 12, line 47, change "to" to --of--.
Column 12, line 53, change "pitch" to --pinch--.
Column 18, line 50, delete "said".
Column 18, line 53, change "said" to --the--.
Column 20, after line 34 the following should be added:

27. The method of concentrating a beam on a target comprising:
directing a high-energy pulsed beam comprising bursts of electrons, in a first direction, toward the target,
pinching said beam for a first portion of its length which portion is spaced from the target, said beam having a self-magnetic field, said pinching being effected by the self-magnetic field around the beam, to provide a beam diameter of at least 1 mm. at, at least, one place along said first portion,
the improvement comprising:
further pinching the beam, over a second portion of its length which second portion extends from the first portion to the target, by limiting the size of the self-magnetic field around the beam to a smaller cross-section than the cross-section of the first-named field while increasing the atomic ion concentration in the beam so that the small-size cross-section of the self-magnetic field plus the increased atomic ion concentration will reduce the beam radius to at least as small as 0.1 mm. and thereby cause the beam to be pinched to a smaller cross-section than resulted from the first pinching step.

UNITED STATES PATENT AND TRADEMARK OFFICE
CERTIFICATE OF CORRECTION

PATENT NO. : 4,363,774
DATED : December 14, 1982
INVENTOR(S) : Willard H. Bennett It is certified that error appears in the above-identified patent and that said Letters Patent is hereby corrected as shown below:

> further pinching the beam, over a second portion of its length which second portion extends from the first portion to the target, by limiting the size of the self-magnetic field around the beam to a smaller cross-section than the cross-section of the first-named field while increasing the atomic ion concentration in the beam so that the small-size cross-section of the self-magnetic field plus the increased atomic ion concentration will reduce the beam radius to at least as small as 0.1 mm. and thereby cause the beam to be pinched to a smaller cross-section than resulted from the first pinching step.

On the title page "26 Claims" should be --27 Claims--.

This certificate supersedes certificate of correction issued July 31, 1984.

Signed and Sealed this

Fifth Day of November 1985

[SEAL]

Attest:

DONALD J. QUIGG

Attesting Officer

Commissioner of Patents and Trademarks